United States Patent
Panasyuk et al.

(10) Patent No.: US 9,912,654 B2
(45) Date of Patent: Mar. 6, 2018

(54) IP SECURITY CERTIFICATE EXCHANGE BASED ON CERTIFICATE ATTRIBUTES

(75) Inventors: Anatoliy Panasyuk, Bellevue, WA (US); Dharshan Rangegowda, Seattle, WA (US); Abhishek Shukla, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 556 days.

(21) Appl. No.: 12/616,789

(22) Filed: Nov. 12, 2009

(65) Prior Publication Data
US 2011/0113481 A1    May 12, 2011

(51) Int. Cl.
*H04L 29/06* (2006.01)
*H04L 9/32* (2006.01)

(52) U.S. Cl.
CPC ........ *H04L 63/0823* (2013.01); *H04L 9/3263* (2013.01); *H04L 63/164* (2013.01); *G06F 2221/2105* (2013.01); *G06F 2221/2149* (2013.01); *H04L 2209/76* (2013.01); *H04L 2209/80* (2013.01)

(58) Field of Classification Search
None
See application file for complete search history.

(56) References Cited

U.S. PATENT DOCUMENTS

| 5,530,758 A * | 6/1996 | Marino et al. ............... 713/150 |
| 5,548,646 A | 8/1996 | Aziz et al. | |
| 6,353,886 B1 * | 3/2002 | Howard ............. H04L 41/0893 380/255 |
| 6,915,437 B2 | 7/2005 | Swander et al. | |
| 7,073,055 B1 * | 7/2006 | Freed et al. .................. 713/155 |
| 7,461,250 B1 | 12/2008 | Duane et al. | |

(Continued)

FOREIGN PATENT DOCUMENTS

| CN | 1770769 A | 5/2006 |
| JP | 2004274521 A | 9/2004 |

(Continued)

OTHER PUBLICATIONS

Fratto, Mike, "IPSec Vs. SSL: Picking the Right VPN," Sep. 1, 2005, pp. 1-3.*

(Continued)

*Primary Examiner* — Nadia Khoshnoodi (57) ABSTRACT

Architecture that provides Internet Protocol security (IPsec) certificate exchange based on certificate attributes. An IPsec endpoint can validate the security context of another IPsec endpoint certificate by referencing certificate attributes. By facilitating IPsec certificate exchange using certificate attributes rather than solely certificate roots, it is now possible to build multiple isolated network zones using a single certificate authority rather than requiring one certificate authority per zone. Moreover, the ability to use certificate attributes during the IPsec certificate exchange can be leveraged for more focused communications such as QoS (quality of service). Certificate attributes can be utilized to identify the security context of the endpoint. The IPsec certificate use can be locked down to a single IP or group of IPs.

18 Claims, 9 Drawing Sheets

(56) References Cited

U.S. PATENT DOCUMENTS

| | | | |
|---|---|---|---|
| 8,892,475 B2* | 11/2014 | Tallent, Jr. | G06Q 20/382 705/65 |
| 2001/0023482 A1* | 9/2001 | Wray | 713/151 |
| 2002/0007346 A1* | 1/2002 | Qiu | G06F 21/33 705/50 |
| 2002/0078227 A1 | 6/2002 | Kronenberg | |
| 2003/0233543 A1* | 12/2003 | Nagaratnam | G06F 21/33 713/157 |
| 2004/0093492 A1* | 5/2004 | Daude et al. | 713/156 |
| 2004/0181665 A1* | 9/2004 | Houser | 713/158 |
| 2005/0086468 A1* | 4/2005 | Meandzija | H04L 63/0428 713/156 |
| 2005/0257045 A1* | 11/2005 | Bushman et al. | 713/156 |
| 2006/0085850 A1 | 4/2006 | Mayfield et al. | |
| 2006/0174125 A1* | 8/2006 | Brookner | 713/176 |
| 2007/0204149 A1 | 8/2007 | Balfanz et al. | |
| 2008/0022392 A1 | 1/2008 | Karpati et al. | |
| 2009/0025080 A1 | 1/2009 | Lund et al. | |
| 2009/0037997 A1 | 2/2009 | Agbabian et al. | |
| 2009/0210703 A1* | 8/2009 | Epstein et al. | 713/157 |
| 2010/0318788 A1* | 12/2010 | Salvarani et al. | 713/156 |
| 2011/0023482 A1 | 2/2011 | Styles et al. | |

FOREIGN PATENT DOCUMENTS

| | | |
|---|---|---|
| JP | 2004364315 A | 12/2004 |
| JP | 2006134312 A | 5/2006 |
| KR | 1020060055406 A | 5/2006 |

OTHER PUBLICATIONS

Friedman, et al., "Short-Term Certificates", retrieved at <<http://tools.ietf.org/html/draft-friedman-ike-short-term-certs-01>>, Dec. 25, 2006.

Juste, et al., "On the Use of Social Networking Groups for Automatic Configuration of Virtual Grid Environments", retrieved at <<http://www.acis.ufl.edu/~ptony82/papers/gce08.pdf>>, Oct. 5, 2009.

"International Search Report", dated Jun. 24, 2011, Application No. PCT/US2010/054573, Filed Date: Oct. 28, 2010, pp. 9.

"First Office Action and Search Report Issued in Chinese Patent Application No. 201080051233.4", dated Feb. 27, 2014, 14 Pages.

"Second Office Action Issued in Chinese Patent Application No. 201080051233.4", dated Nov. 14, 2014, 11 Pages.

"Office Action Issued in Japan Patent Application No. 2012-538846", dated Oct. 21, 2014, 12 Pages.

Lynn, et al., "X.509 Extensions for IP Addresses and AS Identifiers", Request on Comments: 3779, Network Working Group, Jun. 2004, 27 Pages.

Isohara, et al., "Security Key Infrastructure to Certificate Security Countermeasures", IPSJ Transactions, Information Processing Society of Japan (IPSJ), vol. 47, Issue 2, Feb. 15, 2006, pp. 434-445.

"Search Report Issued in European Patent Application No. 10830474.2", dated Dec. 6, 2016, 7 Pages.

"Third Office Action Issued in Chinese Patent Application No. 201080051233.4" dated May 19, 2015, 11 Pages.

"Office Action Issued in Korean Patent Application No. 10-2012-7012090", dated Sep. 23, 2016, 8 Pages.

"Office Action Issued in Korean Patent Application No. 10-2012-7012090", dated Mar. 30, 2017, 5 Pages.

Oyama, et al., "Introduction to X 500 Directory, 2nd Edition", in Tokyo Denki University Representative Koichiro Maruyama, Mar. 20, 2001, 9 Pages.

Tsujimoto, et al., "A Study of End-to-End VPN using IPv6 IPSec with Online Query", IFICE Technical Report, Japan, The Institute of Electronics, Information and Communication Engineers, vol. 101, Issue 214, Jul. 18, 2001, pp. 205-210.

* cited by examiner

IP SECURITY CERTIFICATE EXCHANGE BASED ON CERTIFICATE ATTRIBUTES

BACKGROUND

Internet protocol security (IPsec) offers authentication and encryption services to IP packets, as well as mutual authentication of communicating peers. IPsec communication between two peer endpoints typically involves two phases: mutual authentication and negotiation of traffic protection parameters, and application of the protection parameters to the traffic between the peers (e.g., encryption and/or authentication). In the first phase, one technique for the peers to authenticate each other is through the use of certificates. Each peer endpoint of the connection is provided with a certificate that authorizes the corresponding endpoint to participate in an IPsec session with the other endpoint. In order for the two endpoints to establish a certificate-based IPsec session, both machines need to have a certificate from a common trusted certificate authority.

In some datacenters it may be desirable to establish multiple isolation contexts. For example, an ISP (Internet service provider) can have multiple customers and needs to provide a secure isolated zone for each customer. In order to achieve this isolation with the current infrastructure, the ISP deploys a certificate authority for each zone. The deployment and maintenance of multiple certificate authorities is a time consuming and labor intensive process.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides Internet protocol security (IPsec) certificate exchange based on certificate attributes. This enables one IPsec endpoint to validate the security context of another IPsec endpoint certificate by referencing certificate attributes, in addition to the certificate root. By facilitating IPsec certificate exchange using certificate attributes rather than solely certificate roots it is now possible to build multiple isolated network zones using a single certificate authority rather than requiring one certificate authority per zone.

Moreover, the ability to use certificate attributes during the IPsec certificate exchange can be leveraged for more focused communications. For example, QoS (quality of service) fields can be used to give higher priority to one endpoint over another endpoint.

Furthermore, certificate attributes can be utilized during the IPsec certificate exchange process to identify the security context of the endpoint. For example, the certificate can contain an attribute that is the unique ID (identifier) of the security context. When a receiving IPsec endpoint receives a request from another endpoint, the receiving endpoint can validate that the security context of the certificate installed on the current machine is the same as the security context of the certificate of the requestor.

Still further, the IPsec certificate use can be locked down to a single IP or group of IPs. One of the attributes in the IPsec certificate can be the IP address(es) with which it can be used. This prevents the certificate from being copied and reused on another machine that has a different IP address.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture introduces IPsec (Internet protocol security) certificate exchange based on certificate attributes. This enables two IPsec endpoints each having certificates to validate the security context of the other by referencing certificate attributes, in addition to the certificate root. This creation of multiple isolated network zones is now possible using a single certificate authority rather than requiring one certificate authority per zone.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
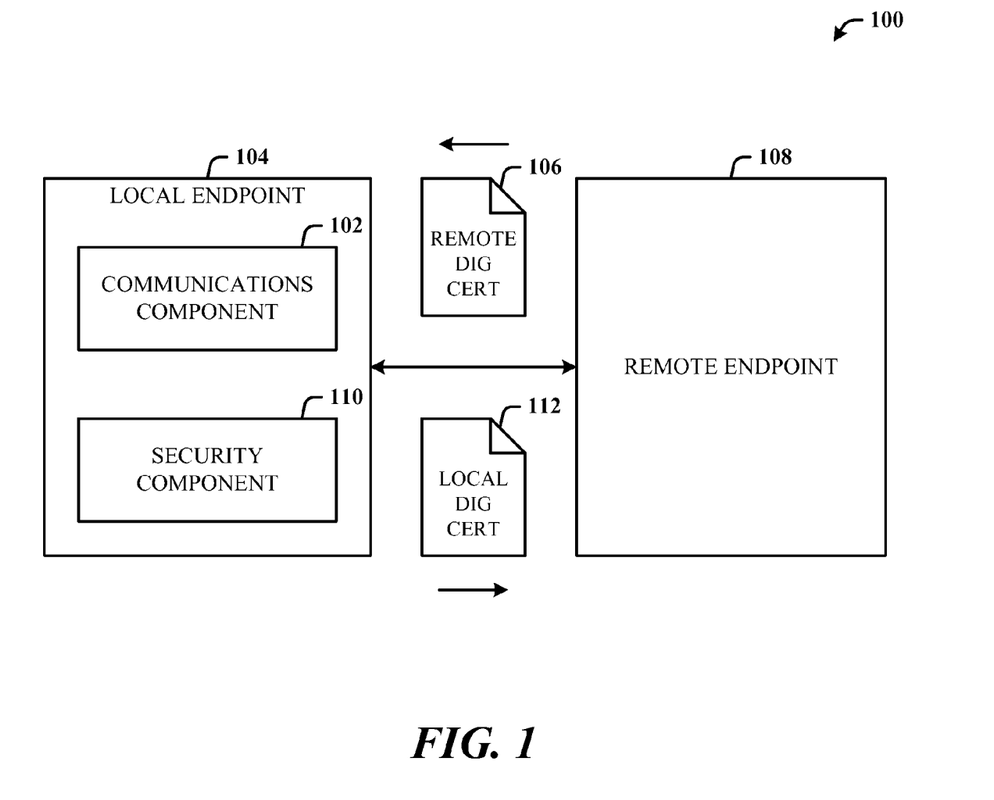
FIG. 1 illustrates computer-implemented security system in accordance with the disclosed architecture.

FIG. 1 illustrates a computer-implemented security system 100 in accordance with the disclosed architecture. The system 100 includes a communications component 102 of a local endpoint 104 that receives a digital certificate 106 from a remote endpoint 108. The communications component 102 can include at least the hardware and/or software for sending and receiving data packets. The digital certificate 106 includes certificate attributes. The system 100 can also include a security component 110 of the local endpoint 104 that processes one or more of the certificate attributes to validate IPsec communications with the remote endpoint 108.

In other words, the system 100 facilitates peer certificate validation during IPsec using certificate attributes rather than of solely based on the root certificate. Each peer certificate includes attributes that describe the security context of the certificate. For example, one of the attributes in the IPsec certificate can be customer ID.

During an IPsec certificate exchange between the endpoints (the local endpoint 104 sending its certificate 112 to the remote endpoint 108) each endpoint can examine the attributes of the certificate presented by the peer and make a decision on setting up the IPsec session. In the above example, if the certificate presented by the peer contains the same customer ID, then an IPsec session is allowed. However, both certificates (remote certificate 106 and local certificate 112) still need to be issued by a single certificate authority. This solution utilizes only one certificate authority irrespective of the number of isolation contexts deployed.

Another aspect is the ability to increase security by locking IPsec certificates to a specific IP address or addresses. For example, the certificate can include an IP address (or group of addresses) of the physical network on which the certificate is intended to be used. When opening the IPsec connection, each endpoint compares the actual IP address the other endpoint is using to a list of IP addresses in the presented certificate. If the IP address of the other endpoint is on the list, then the connection can proceed. If the address is not on the list, the connection will fail, since this can be an indication of a hijacking attempt, where the attacker managed to copy the certificate from a legitimate machine to a different (unauthorized) machine, for example. The disclosed architecture provides the capability to detect such attacks, thereby increasing overall security of the solution.

As previously indicated, the security component 110 can also validate the IPsec communications using a root certificate. The digital certificate 106 (and certificate 112) includes one or more certificate attributes that define a security context of the digital certificate. Additionally, the digital certificate can be locked to a specific certificate attribute, such as a specific address or group of addresses. The security component 110 can process certificate attributes according to attribute priority.

In other words, one attribute can be given more weight over another attribute or set of attributes. For example, a QoS (quality of service) attribute can be used to give higher priority to one endpoint over another endpoint. The attribute analysis process can also include comparing certificate attribute(s) to a predetermined set of attributes, and if all attributes match, the IPsec session can be established; however, if only two of the three match, the session fails, or makes at a reduced level of communications.

The one or more certificate attributes can include an IP address of a proxy system through which an endpoint communicates and/or a zone is located. Note that the peer remote endpoint 108 can also include similar components (e.g., communications component and security component) as the local endpoint 104 for receiving and processing the local digital certificate 112 or other certificates the remote endpoint 108 may receive from other peer endpoints.

Figure 2:
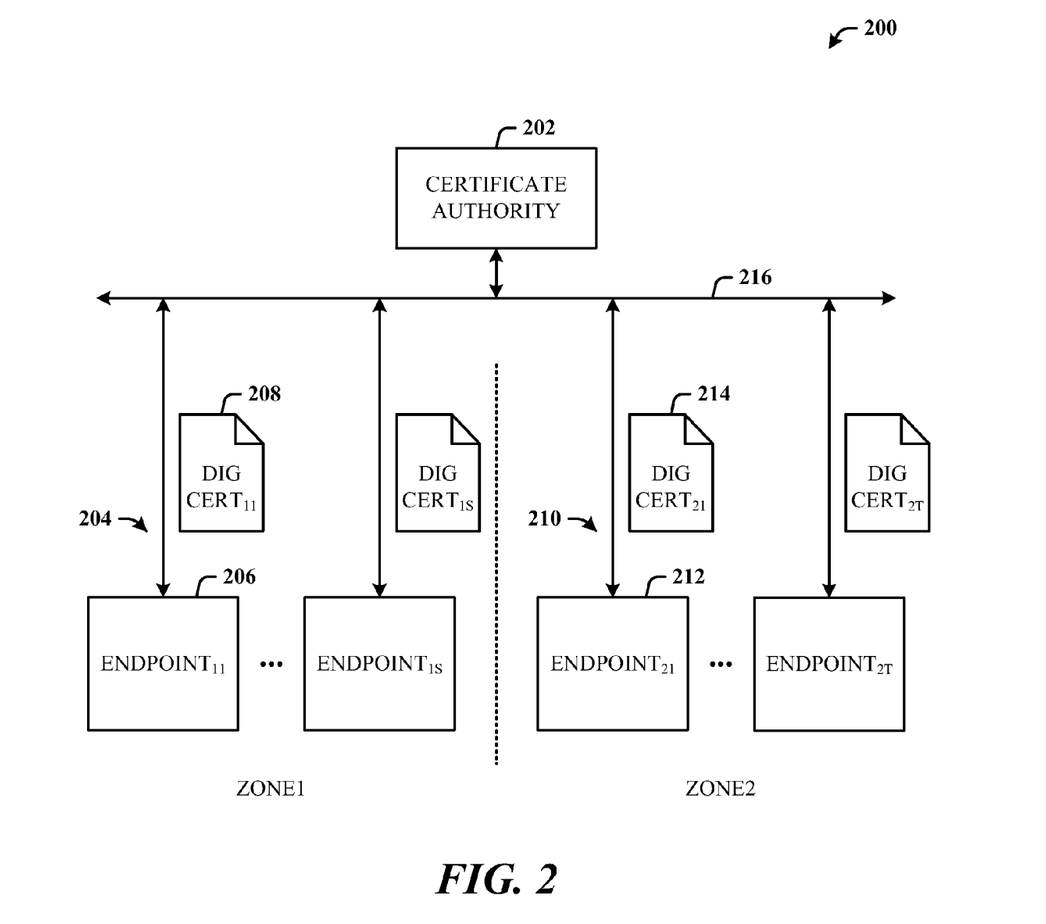
FIG. 2 illustrates a security system that includes a certificate authority for certificate generation and administration over multiple zones.

FIG. 2 illustrates a security system 200 that includes a certificate authority 202 for certificate generation and administration over multiple zones. The certificate authority 202 can now be a single (the only) authority deployed to generate and administer (issue) digital certificates for IPsec communications over the multiple zones. Here, the system 200 includes two zones: a first zone (Zone1), and a second zone (Zone2) (although many more zones can be employed). The first zone includes multiple endpoints 204 ($Endpoint_{11}$, ..., $Endpoint_{1S}$) (each of the endpoints 204 being issued a digital certificate) such as a first zone endpoint 206 receiving and utilizing a first zone certificate 208 ($Dig\ Cert_{11}$). Similarly, the second zone includes multiple endpoints 210 ($Endpoint_{21}$, ..., $Endpoint_{2T}$) (each of the endpoints 210 being issued a digital certificate) such as a second zone endpoint 212 receiving and utilizing a second zone certificate 214 ($Dig\ Cert_{21}$).

The certificate authority 202 can be the sole certificate authority that provides certificate administration over a network 216 to both the first and second zones and associated endpoints, and possibly as well as to endpoints and zones outside the network 216.

In operation, if the first zone endpoint 206 requests an IPsec session with the second zone endpoint 212, the endpoints (206 and 212) exchange corresponding digital certificates (208 and 214) over an IPsec connection. The first zone endpoint 206 analyzes the second zone certificate 214 for one or more security context attributes, and potentially other attributes, as does the second zone endpoint 212 to the first zone certificate 208. Additionally, the root certificates of the first and second zone endpoints (206 and 212) can also be passed and validated. If validation is successful from both endpoints, an IPsec session can be established between the endpoints (206 and 212).

Figure 3:
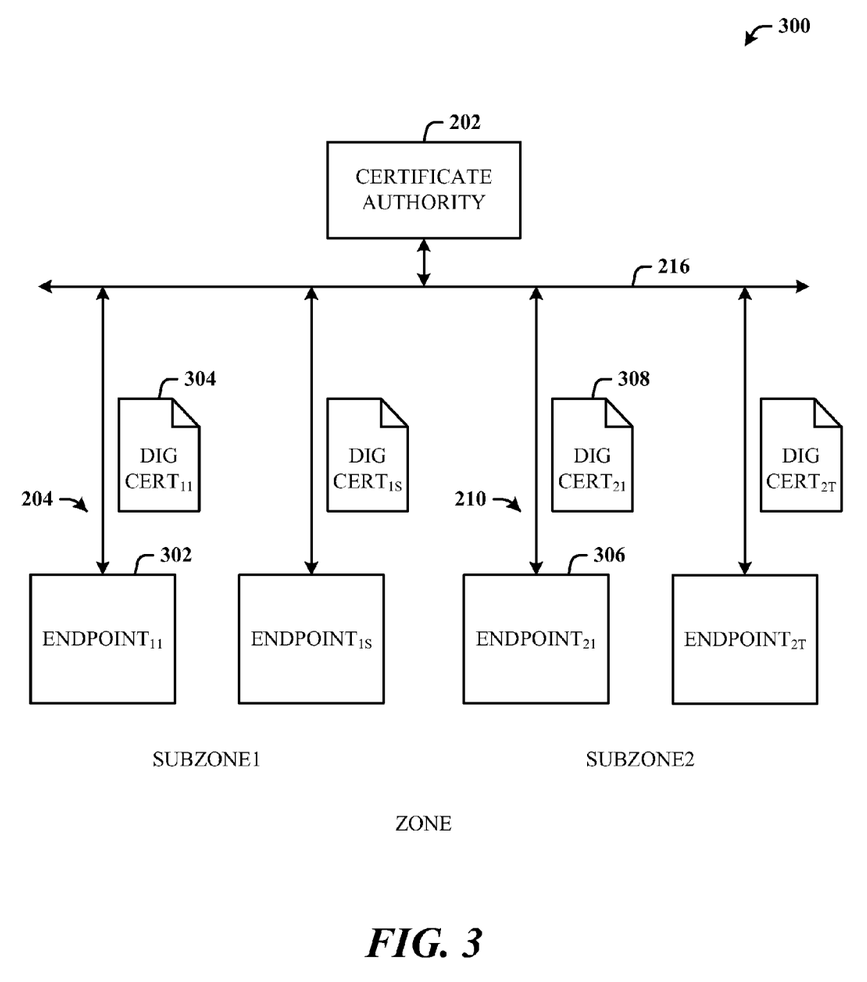
FIG. 3 illustrates a security system that includes the certificate authority for certificate generation and administration within subzones of a single zone.

FIG. 3 illustrates a security system 300 that includes the certificate authority 202 for certificate generation and administration within subzones of a single zone. The certificate authority 202 can still be the single (only) authority deployed to generate and administer (issue) digital certificates for IPsec communications and sessions over the multiple subzones (or segments). Here, the system 300 includes two subzones of a zone: a first subzone (Subzone1), and a second subzone (Subzone2) (although many more subzones can be employed). The first subzone includes the multiple endpoints 204 ($Endpoint_{11}$, ..., $Endpoint_{1S}$) (each endpoint being issued a digital certificate) such as a first subzone endpoint 302 receiving and utilizing a first subzone certificate 304 ($Dig\ Cert_{11}$). Similarly, the second subzone includes the multiple endpoints 210 ($Endpoint_{21}$, ..., $Endpoint_{2T}$) (each endpoint being issued a digital certificate) such as a second subzone endpoint 306 receiving and utilizing a second zone certificate 308 ($Dig\ Cert_{21}$).

The certificate authority 202 can be the sole certificate authority for the zone and subzones that provides certificate administration over the network 216 to both the first and second subzones and associated endpoints, and possibly as well as to endpoints and zones/subzones outside the network 216.

In operation, if the first subzone endpoint 302 requests an IPsec session with the second subzone endpoint 306, the endpoints (302 and 306) exchange corresponding digital certificates (304 and 308) over an IPsec connection. The first subzone endpoint 302 analyzes the second subzone certificate 308 for one or more security context attributes, and potentially other attributes, as does the second subzone endpoint 306 to the first subzone certificate 304. Additionally, the root certificates of the first and second subzone endpoints (302 and 306) can also be passed and validated. If validation is successful from both endpoints, an IPsec session can be established between the endpoints (302 and 306).

Figure 4:
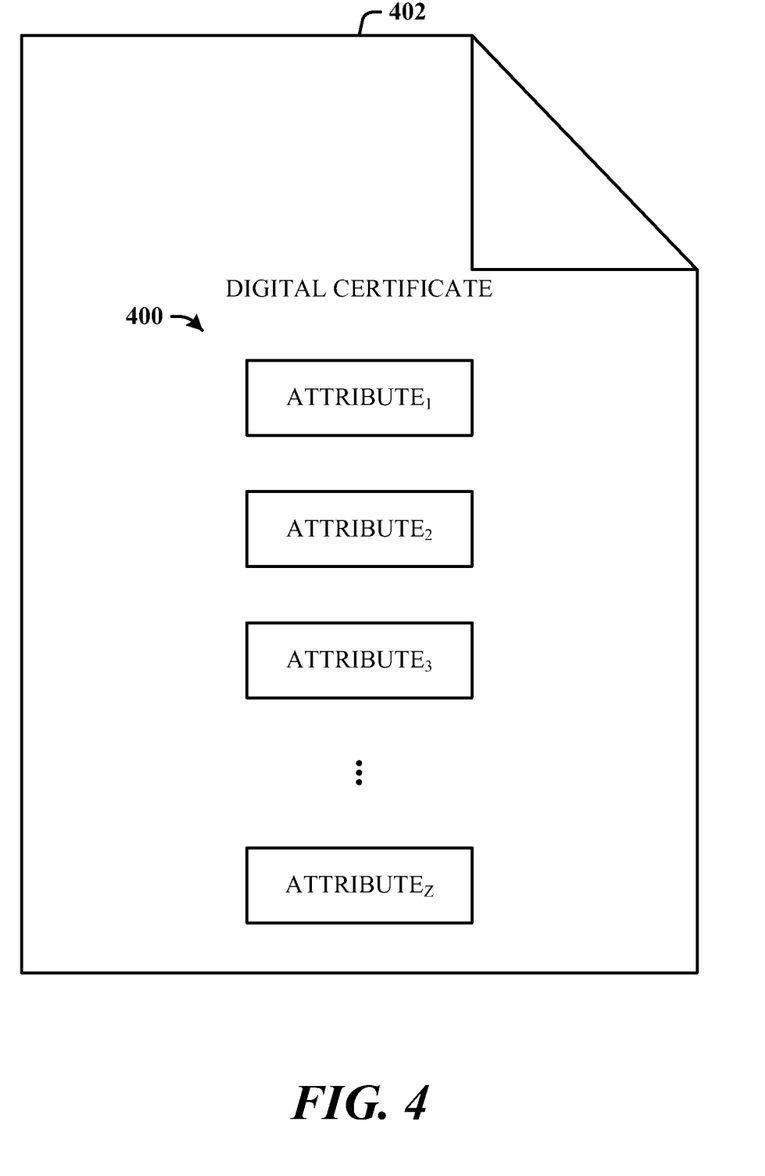
FIG. 4 illustrates exemplary certificate attributes that can be employed in a digital certificate for IPsec communications.

FIG. 4 illustrates exemplary certificate attributes 400 that can be employed in a digital certificate 402 for IPsec communications. As previously indicated, the attributes 400 can include QoS data, unique ID of the security context, IP address of an endpoint (physical machine or virtual machine) with which an IPsec session can be obtained, IP addresses for a group (or groups) of endpoints with which an IPsec session(s) can be obtained, customer ID (e.g., for a company), zone ID, circle ID, IP address of proxy system, and so on. The disclosed architecture applies to all classes (e.g., individuals requiring proof of identity, organizations, servers, online business transaction, private organization or governmental, etc.) of digital certificates as well.

The attribute processing of IPsec can process only a single attribute (company ID), or multiple attributes (e.g., company ID and zone1). Additionally, a weighting system can be employed such that a first attribute is given more weight than a third attribute, for example. Alternatively, or in combination therewith, attributes can be ranked according to predetermined criteria, such as a zone attribute being ranked as top priority, followed by customer ID as a lesser priority, and so on.

Note that an endpoint can include multiple certificates each defining access to different zones and endpoints according to the attributes.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
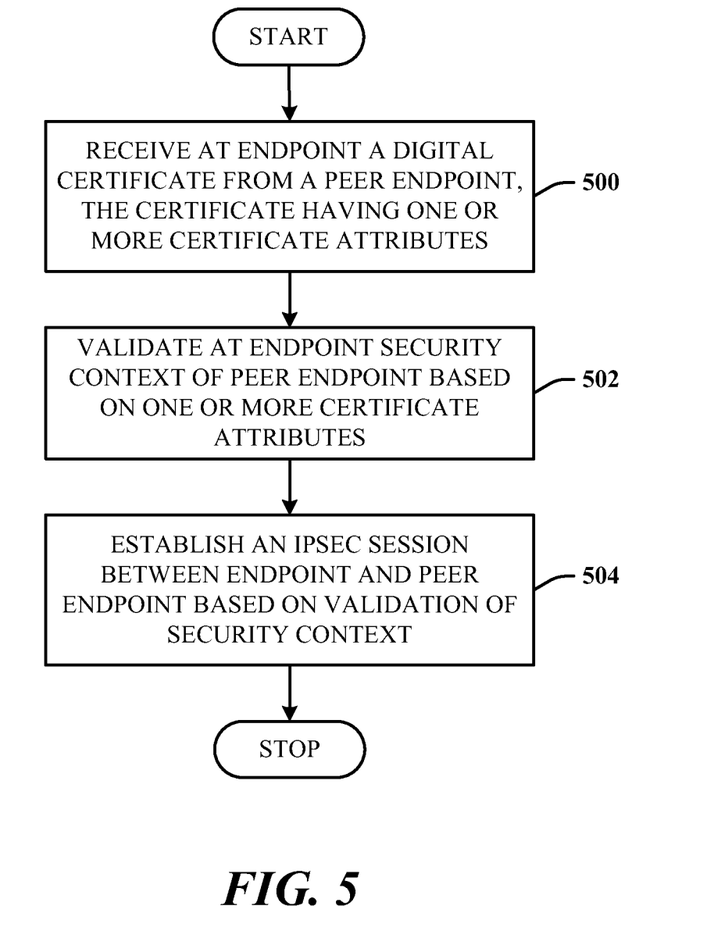
FIG. 5 illustrates a computer-implemented security method.

FIG. 5 illustrates a computer-implemented security method. At 500, a digital certificate is received at an endpoint from a peer endpoint, the certificate having one or more certificate attributes. At 502, the security context of the peer endpoint is validated at the endpoint based on the one or more certificate attributes. At 504, an IPsec session is established between the endpoint and the peer endpoint based on validation of the security context.

Figure 6:
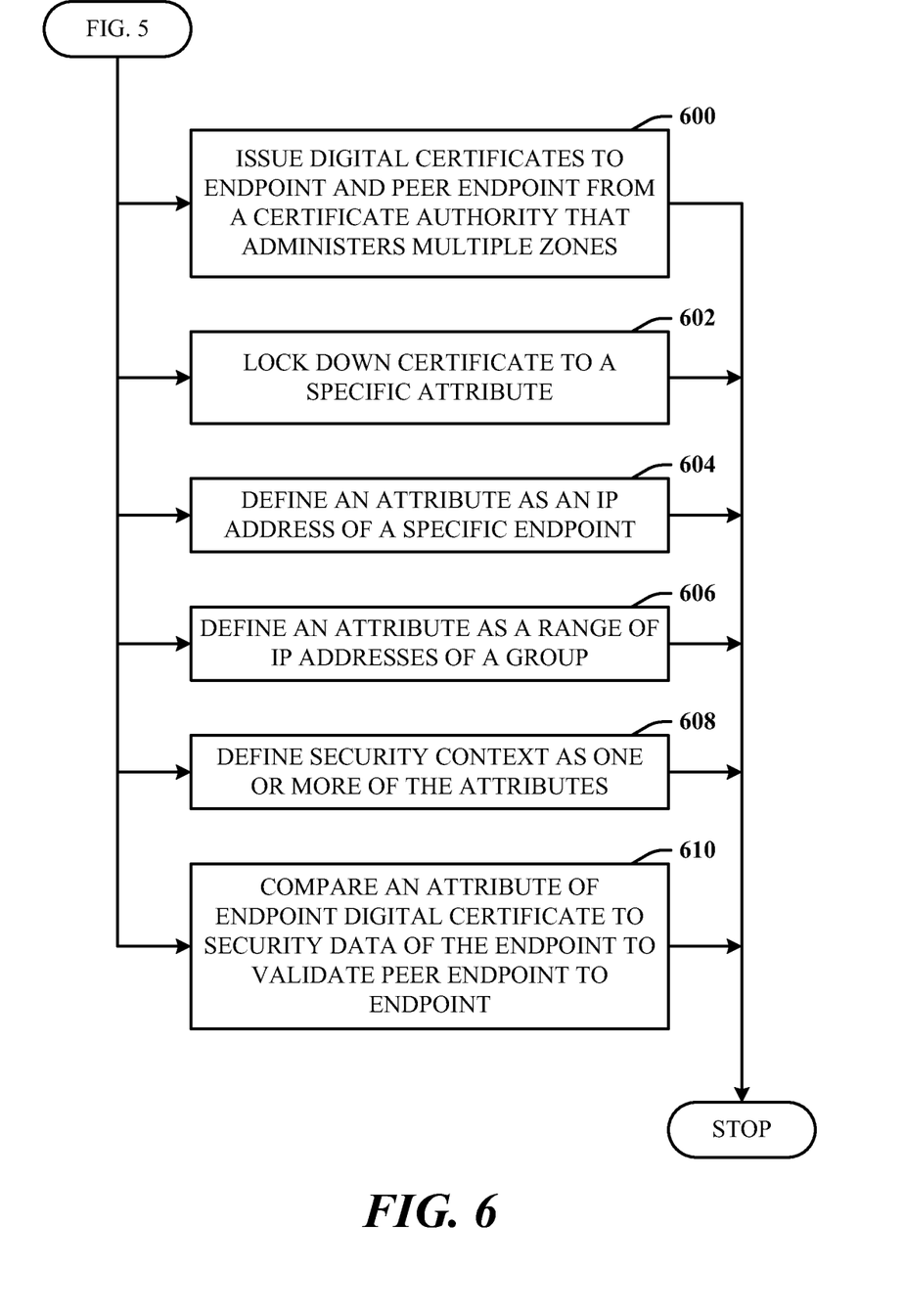
FIG. 6 illustrates additional aspects of the method of FIG. 5.

FIG. 6 illustrates additional aspects of the method of FIG. 5. At 600, digital certificates are issued to the endpoint and the peer endpoint from a certificate authority that administers multiple zones. At 602, the certificate is locked down to a specific attribute. At 604, an attribute is defined as an IP address of a specific endpoint. At 606, an attribute is defined as a range of IP addresses of a group. At 608, the security context is defined as one or more of the attributes. At 610, an attribute of the endpoint digital certificate is compared to security data of the endpoint to validate the peer endpoint to the endpoint.

Figure 7:
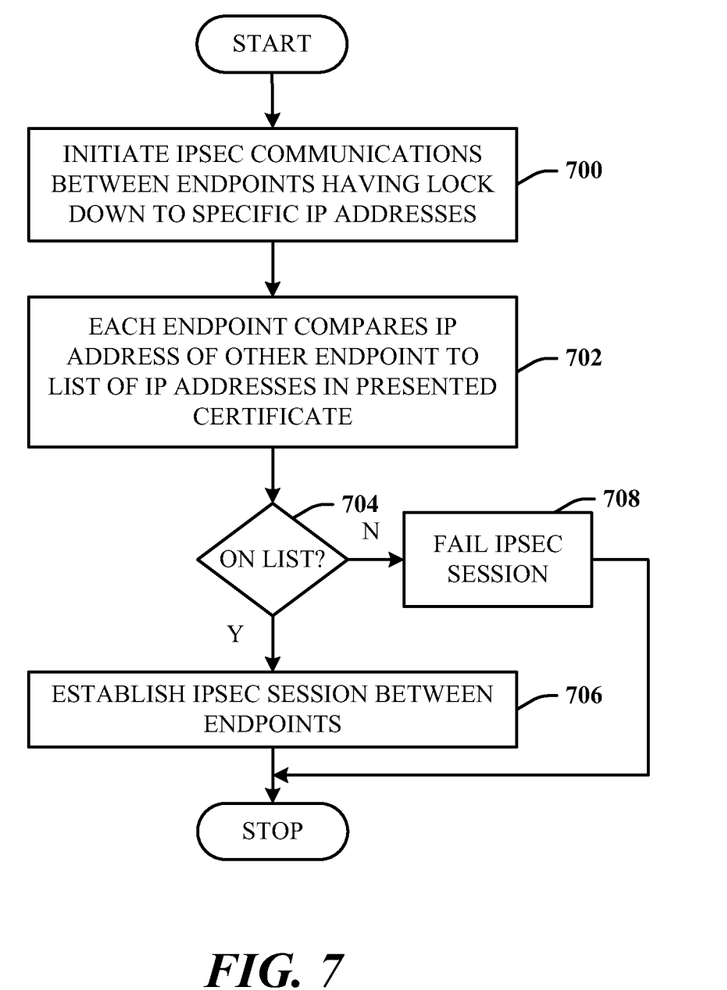
FIG. 7 illustrates a method of processing an IPsec certificate to an IP address.

FIG. 7 illustrates a method of processing an IPsec certificate to an IP address. At 700, IPsec communications is initiated between endpoints having lock down to a specific IP addresses. At 702, each endpoint compares the IP address of the other endpoint to a list of IP addresses in the presented certificate. At 704, if the IP address is on the list, flow is to 706, to establish the IPsec session between the endpoints. Alternatively, at 704, if the IP address is not on the list, flow is to 708 to fail start of the IPsec session.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
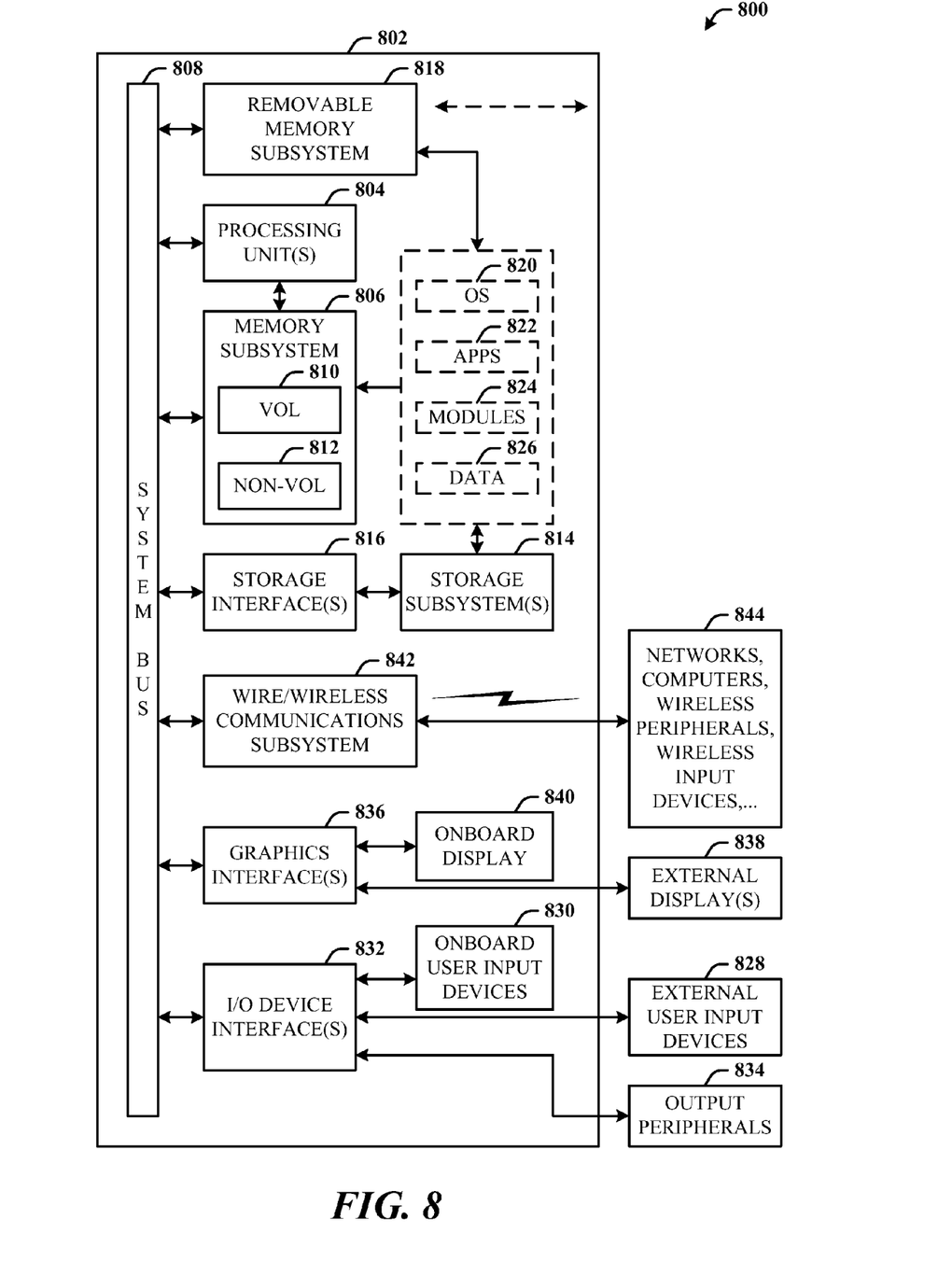
FIG. 8 illustrates a block diagram of a computing system operable to execute attribute processing for IPsec communications in accordance with the disclosed architecture.

Referring now to FIG. 8, there is illustrated a block diagram of a computing system 800 operable to execute attribute processing for IPsec communications in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities and components of the system 100 of FIG. 1, the entities and components of the system 200 of FIG. 2, the entities and components of the system 300 of FIG. 3, the certificate and attributes of FIG. 4, and the methods represented by the flow charts of FIGS. 5-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE Microsoft Corporation 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote systems and/or storage systems.

Figure 9:
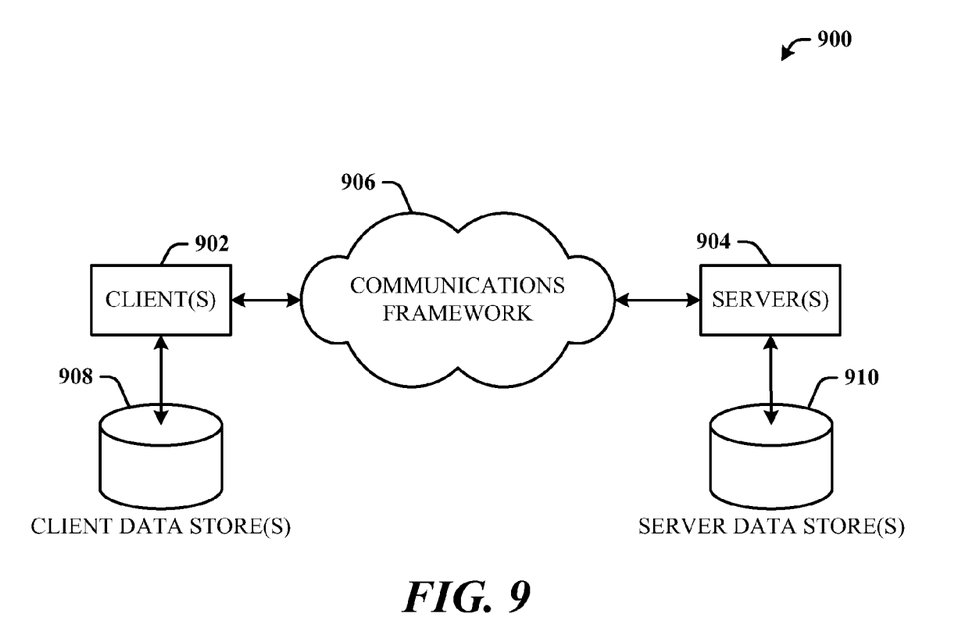
FIG. 9 illustrates a schematic block diagram of a computing environment that processes certificate attributes for IPsec communications.

Referring now to FIG. 9, there is illustrated a schematic block diagram of a computing environment 900 that processes certificate attributes for IPsec communications. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented security system, comprising:
   a communications component of a local endpoint configured to receive a digital certificate from a remote endpoint, the digital certificate issued by a single certificate authority which administers multiple zones, and the digital certificate having certificate attributes that define a security context of the digital certificate, wherein the certificate attributes are weighted according to a weighting system and ranked according to predetermined criteria;
   a security component of the local endpoint configured to validate the local endpoint based on processing of one or more of the weighted and ranked certificate attributes to enable Internet Protocol security (IPsec) communications with the remote endpoint based on validation of the security context, wherein the IPsec communications occur at a reduced level when less than all of the certificate attributes match; and
   a hardware processor configured to execute computer-executable instructions in a memory device, the instructions executed to enable the communications component and the security component.

2. The system of claim 1, wherein the security component also validates the communications using a root certificate.

3. The system of claim 1, wherein the certificate attributes comprise at least one of quality of service (QoS) data, unique ID of the security context, IP address or addresses of at least one endpoint with which IPsec sessions can be obtained, or IP address of a proxy system.

4. The system of claim 1, wherein the digital certificate is locked to a specific certificate attribute.

5. The system of claim 1, wherein the digital certificate is locked to a specific address or group of addresses.

6. The system of claim 1, wherein the certificate authority issues the digital certificate and other digital certificates for IPsec communications over multiple zones.

7. The system of claim 1, wherein the one or more certificate attributes include an IP address of a proxy system and a zone.

8. A computer-implemented security system, comprising:
   a communications component of a local endpoint configured to receive a digital certificate from a remote endpoint, the digital certificate issued by a single certificate authority which administers multiple zones, the digital certificate having certificate attributes that define a security context, wherein the certificate attributes are weighted according to a weighting system and ranked according to predetermined criteria;
   a security component of the local endpoint configured to validate one or more of the weighted and ranked certificate attributes and a root certificate to enable Internet Protocol security (IPsec) communications with the remote endpoint, wherein the IPsec communications occur at a reduced level when less than all of the certificate attributes match; and
   a hardware processor configured to execute computer-executable instructions in a memory device, the instructions executed to enable the communications component and the security component.

9. The system of claim 8, wherein the certificate attributes comprise QoS (quality of service) fields that give higher priority to one endpoint over another endpoint.

10. The system of claim 8, wherein the digital certificate is locked to a specific certificate attribute.

11. The system of claim 8, wherein the single certificate authority for multiple zones that issues the digital certificate and other digital certificates for IPsec communications over the multiple zones.

12. A computer-implemented, security method, comprising:
    receiving at an endpoint a digital certificate from a peer endpoint, the certificate issued by a single certificate authority which administers multiple zones, the certificate having one or more certificate attributes that describe a security context of the certificate, wherein the certificate attributes are weighted according to a weighting system and ranked according to predetermined criteria;
    validating at the endpoint the security context of the peer endpoint by referencing the one or more weighted and ranked certificate attributes;
    establishing an Internet Protocol security (IPsec) session between the endpoint and the peer endpoint based on validation of the security context, wherein the IPsec session occurs at a reduced level when less than all of the certificate attributes match; and
    utilizing a hardware processor that executes instructions stored in memory, the instructions executed to enable the receiving, validating, and establishing.

13. The method of claim 12, further comprising issuing digital certificates to the endpoint and the peer endpoint from a certificate authority that administers multiple zones.

14. The method of claim 12, further comprising locking down the certificate to a specific attribute.

15. The method of claim 12, further comprising defining an attribute as an IP address of a specific endpoint.

16. The method of claim 12, further comprising defining an attribute as a range of IP addresses of a group.

17. The method of claim 12, further comprising identifying the security context of the endpoint based on one or more of the attributes.

18. The method of claim 12, further comprising comparing an attribute of the digital certificate to security data of the endpoint to validate the peer endpoint to the endpoint.

* * * * *